E. L. WHITE.
ADJUSTABLE BRAKE HEAD.
APPLICATION FILED AUG. 8, 1910.
1,118,715.
Patented Nov. 24, 1914.
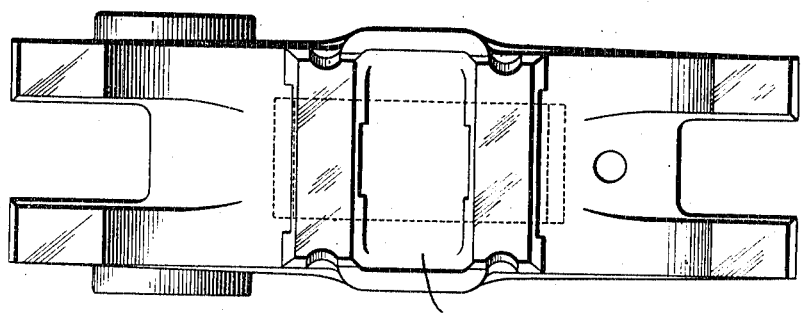
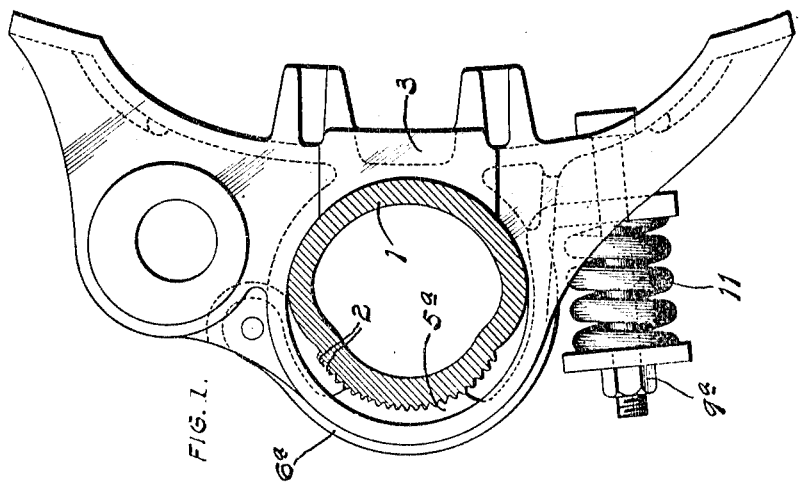
WITNESSES
INVENTOR
EDWARD L. WHITE

UNITED STATES PATENT OFFICE.

EDWARD L. WHITE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

ADJUSTABLE BRAKE-HEAD.

1,118,715.  Specification of Letters Patent.  Patented Nov. 24, 1914.

Application filed August 8, 1910. Serial No. 576,260.

*To all whom it may concern:*

Be it known that I, EDWARD L. WHITE, a citizen of the United States, residing at Chicago, Illinois, have invented a certain new and useful Improvement in Adjustable Brake-Heads, of which the following is a full, clear, and exact description, such as will enable others skilled in the art to which it appertains to make and use the same, reference being had to the accompanying drawings, forming part of this specification, in which—

Figure 1 is an end elevational view partly in section of my improved adjustable brake head. Fig. 2 is a face view of the structure shown in Fig. 1.

This invention relates to a new and useful improvement in adjustable heads for brake beams.

The object of my present invention is to simplify the construction of the adjusting means, and so construct said adjusting means that the pressure by which the head is held in position on the beam may be regulated or adjusted.

In the drawings 1 indicates the sleeve or thrust block of a trussed brake beam, which is preferably provided with a groove in its periphery, in the bottom of which groove are series of corrugations 2, it is, of course, understood that similar constructions could be provided on a solid beam for the reception of my improved adjustable head.

3 is the brake head of usual construction having a socket to receive the sleeve or part of the brake beam on which it is mounted. This brake head is provided with an opening 4 in the rear wall of its socket which divides said wall into semi-cylindrical portions adapted to encircle the rear portion of the sleeve.

$6^a$ indicates a strap having one end connected to the head 3, preferably by means of a rivet or pivot 7, and having its other end apertured for a bolt 8, whose nut $9^a$ clamps the strap in place. The strap $6^a$ is provided with a corrugated face $5^a$ which projects into the groove in the sleeve 1 so as to engage the corrugations 2 to hold the head in adjusted position on the beam. The free end of the strap is engaged by a spring 11, whereby when the nut $9^a$ is turned down a greater pressure is exerted upon the free end of the strap through the medium of the spring. The spring operates, however, to hold the strap $6^a$ yieldingly against the sleeve so that when originally applied the brake head may accommodate itself to proper position.

In practice the parts are assembled, and the nut $9^a$ is screwed down so as to place the strap under sufficient stress to hold the brake head in position against gravitation. After the brakes are applied two or three times, and the head adjusts itself in proper position the nut $9^a$ may be screwed down more tightly so as to firmly hold the brake head in its proper position.

What I claim is:

1. A brake head formed with integral cylindrical members adapted to embrace a brake beam sleeve, a strap hinged at one end on said brake head intermediate said cylindrical members, said strap having a portion formed to engage the brake beam sleeve intermediate the cylindrical members, and yielding pressure means coöperating with the other end of said strap to hold the same in resilient engagement with the brake beam sleeve.

2. A brake head formed with cylindrical portions adapted to embrace a portion of a brake beam, a strap pivoted to the head in position to be swung into and out of engagement with the brake beam intermediate said cylindrical portions, and means for holding said strap in engagement with the brake beam.

In testimony whereof I hereunto affix my signature in the presence of two witnesses, this third day of August, 1910.

EDWARD L. WHITE.

Witnesses:
 EDW. T. WALKER,
 M. F. HUNTOON.